United States Patent

[11] 3,555,317

| [72] | Inventors | Peter D. Allan<br>Circle Pines;<br>Mortimer J. Huber, St. Paul, Minn. |
|---|---|---|
| [21] | Appl. No. | 821,055 |
| [22] | Filed | May 1, 1969 |
| [45] | Patented | Jan. 12, 1971 |
| [73] | Assignee | Motion Rotators, Inc.<br>Minneapolis, Minn.<br>a corporation of Minnesota. by mesne assignments |

[54] ELECTRIC MOTOR AND CLUTCH
5 Claims, 3 Drawing Figs.

[52] U.S. Cl. ..................................................... 310/78,
310/62
[51] Int. Cl. ....................................................... H02k 11/00
[50] Field of Search............................................ 310/78, 92,
94, 76, 75, 100, 66, 62, 63; 192/41, 43, 46,
105(CS)

[56] References Cited
UNITED STATES PATENTS

| 1,122,206 | 12/1914 | Jennings.......................... | 192/105 |
| 1,669,507 | 5/1928 | Dickson ......................... | 310/78 |
| 1,828,540 | 10/1931 | Marschke...................... | 310/78 |
| 2,487,934 | 11/1949 | Mastropole .................. | 310/78 |
| 2,847,592 | 8/1958 | Gerbaud....................... | 310/78 |
| 2,877,955 | 3/1959 | Bebinger ...................... | 310/78 |
| 3,426,261 | 2/1969 | Wallin........................... | 310/78 |

*Primary Examiner*—Milton O. Hirshfield
*Assistant Examiner*—R. Skudy
*Attorney*—Merchant & Gould

ABSTRACT: An electric motor having an internal clutch including a rotor operatively positioned within a stator and mounted on a sleeve having an inner diameter slightly larger than the outer diameter of an output shaft which extends coaxially therethrough. A compression spring coaxially mounted about the sleeve causes first and second frictional clutch plates rotationally affixed relative to the rotor and sleeve to engage adjacent mating clutch plates affixed to the output shaft. The bias provided by the compression spring allows disengagement of the clutch plates when the motor is overloaded thereby preventing damage to the motor.

PATENTED JAN 12 1971

3,555,317

INVENTORS
PETER D. ALLAN
MORTIMER J. HUBER
BY
*Merchant & Gould*
ATTORNEYS 3,555,317

ELECTRIC MOTOR AND CLUTCH

BACKGROUND OF THE INVENTION

1. Field of the Invention

The present invention is applicable in electric motors and especially those having relative low starting torgue. Generally electric motors will be severely damaged if the output shaft is overloaded so that they cannot rotate properly. To prevent possible damage to an electric motor some form of clutch is incorporated so that the motor can continue to turn even when a load applied thereto is too great.

2. Description of the Prior Art

In the prior art electric motors are constructed with the shaft fixedly attached to the rotor and the output shaft is connected through a clutch to the load. In many instances this external clutch is undesirable because it is expensive and requires additional space for the installation thereof. Also, mistakes can easily be made as to the size or adjustments of the clutch so that the motor can still be overloaded. In addition to the above, an external clutch has no protective effect on the motor if internal parts of the motor, such as bearings and the like, become inoperative.

SUMMARY OF THE INVENTION

The present invention relates to an improved clutch-motor combination wherein the rotor is rotatably mounted on the output shaft and clutch apparatus is internally mounted for operation between the rotor and the output shaft of the motor.

It is an object of the present invention to provide a new and improved electric motor-clutch combination.

It is a further object of the present invention to provide an electric motor having an internal clutch mechanism to protect the motor in case of the failure of internal parts.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the FIGS..

DESCRIPTION OF THE PREFERRED EMBODIMENTS

Figure 1:
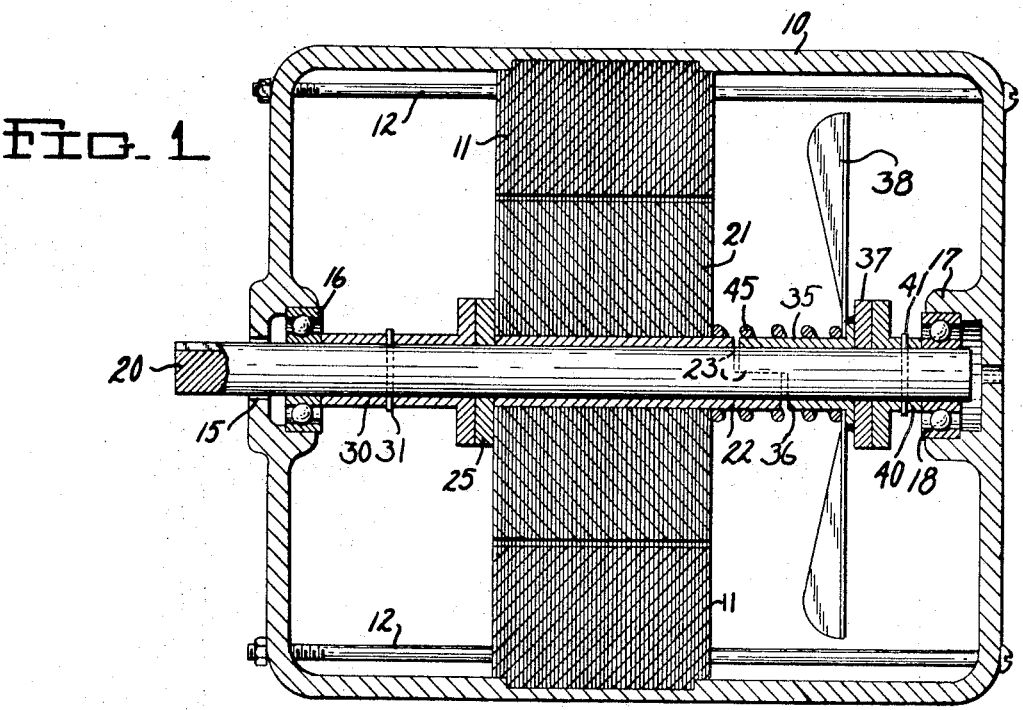
FIG. 1 is an axial sectional view of a first embodiment of the present apparatus.

Referring to the drawings, the numeral 10 designates a motor housing which is illustrated in a somewhat simplified form. The housing 10 has mounted therein a stator core 11 with the housing 10 and stator 11 maintained in the assembled position by means of bolts 12. It should be understood that the motor is illustrated in a somewhat schematic form to simplify the drawings, since the exact type or structure of electric motor is not critical and any electrical motor in which the present improvement can be incorporated can be utilized.

An axial opening 15 is provided at one end of the housing 10 and bearings 16 are mounted therein. A coaxial inwardly directed flange 17 is provided at the opposite end of the housing 10 and bearings 18 are mounted therein. An output shaft 20 is rotatably mounted by means of the bearings 16 and 18 and is adapted to have a load applied to an externally extending end thereof for rotation thereby.

A rotor 21 has a sleeve 22 extending axially therethrough with an inner diameter slightly larger than the outer diameter of the shaft 20. The sleeve 22 forms a bearing for the rotor 21 and may, if desired, be an integral portion thereof. The sleeve 22 is coaxially mounted on the shaft 20 for rotation with respect thereto and so that the rotor 21 is operatively positioned within the stator 11. One end of the sleeve 22, extending outwardly from the rotor 21 has a semicylindrical, axially extending slot 23 formed therein. The opposite end of the sleeve 22 is generally in a plane with the axial end of the rotor 21 and a clutch plate 25 is coaxially affixed thereto with a frictional surface thereof directed axially outwardly.

A tubular member 30 having an inner diameter slightly larger than the outer diameter of the shaft 20, is engaged over the shaft 20 between the bearings 16 and the clutch plate 25. The tubular member 30 is affixed to the shaft 20 for rotation therewith by means of a pin 31. The end of the tubular member 30 adjacent the clutch plate 25 has a radially outwardly directed flange thereon with the surface thereof which is directed toward the clutch plate 25 forming a frictional mating surface for the clutch plate 25.

A sleeve 35, having an inner diameter slightly larger than the outer diameter of the shaft 20, has an axially extending semicylindrical slot 36 in one end thereof and a clutch plate 37 coaxially affixed to the opposite end thereof. The sleeve 35 is mounted on the shaft 20 for rotation relative thereto with the slot 36 and the slot 23 of the sleeve 22 engaged to prevent relative rotation between the sleeve 22 and the sleeve 35 while allowing relative axial movement thereof. The clutch plate 37 has a frictional surface which is directed outwardly away from the rotor 21. A fan 38 is attached to the sleeve 35 for rotation therewith and, upon rotation, forces cooling air around the stator 11 and rotor 21.

A tubular member 40, having an inner diameter slightly larger than the outer diameter of the shaft 20, is positioned over the shaft 20 between the sleeve 35 and the bearing 18. The tubular member 40 is affixed to the shaft 20 for rotation therewith by means of a pin 41 extending through the tubular member 40 and the shaft 20. The end of the tubular member 40 adjacent the sleeve 35 has a radially outwardly directed flange with a frictional surface thereon that engages the frictional surface of the clutch plate 37.

A compression spring 45 is mounted coaxially over the sleeves 22 and 35 between the rotor 21 and the fan 38 so as to provide a bias on the sleeve 35 tending to move it axially away from the sleeve 22. The bias of the spring 45 on the sleeve 35 produces an axial force between the clutch plate 25 an the frictional surface of the tubular member 30 so that rotation of the rotor 21 upon energization of the motor causes rotation of the shaft 20. If the load on the shaft 20 is too great slippage occurs between the clutch plates 25—37 and the mating frictional surfaces of the tubular members 30—40, respectively, so that damage to the electric motor does not occur. Because the fan 38 is affixed to the sleeve 35, the fan 38 continues to rotate even though the shaft 20 is stopped. The force of the spring 45 should be such that slippage will occur between the clutch plates 25—37 and the frictional surfaces of the tubular members 30—40 before a load on the shaft 20 exceeds the maximum output torque of the electric motor.

Thus, because the clutch apparatus is mounted between the rotor 21 and the shaft 20, even if the bearings 16 and 18 do not operate correctly relative rotation between the rotor 21 and stator 11 will not be stopped and damage will not occur to the motor. Further, the fan 38 will continue to operate even though the shaft 20 is overloaded and the motor will operate under normal conditions. In addition to the above, the clutch mechanism is contained within the motor and does not require additional space and, because it is contained within the motor, it can be incorporated with relatively small additional expense.

Figure 2:
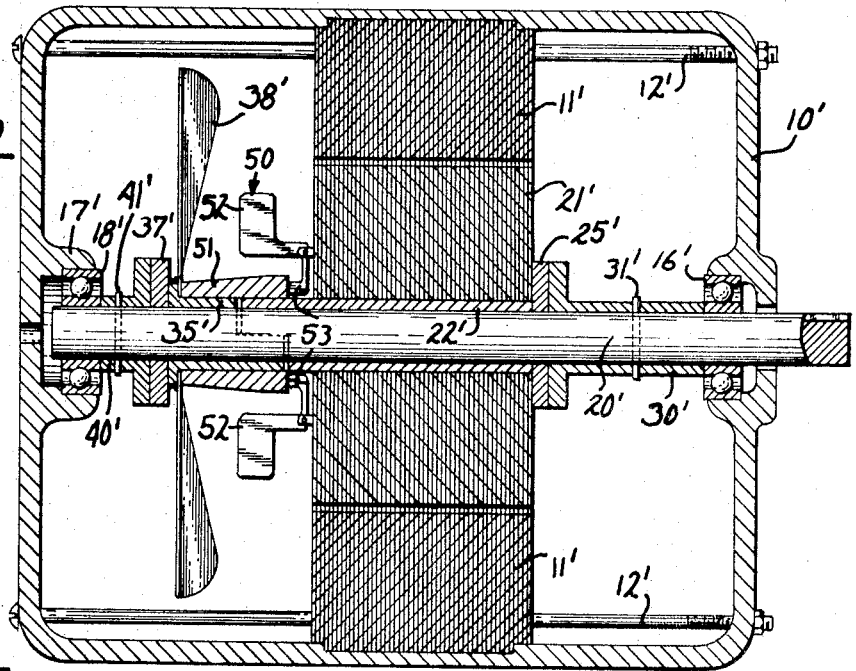
FIG. 2 is an axial sectional view of a second embodiment of the present apparatus.
Figure 3:
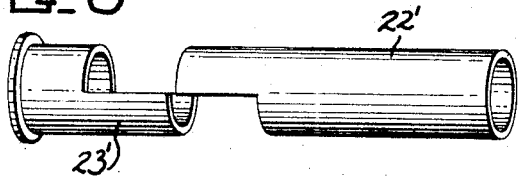
FIG. 3 is an exploded view in perspective of a part of the apparatus illustrated in FIG. 2.

Referring to FIG. 2, a second embodiment of the present invention is illustrated wherein similar parts are designated with similar numerals having a prime added to indicate another embodiment. In this embodiment the spring 45 is removed and a device, generally designated 50, is installed which is sensitive to centrifugal force. The device 50 includes a sleeve 51 having an inner diameter slightly larger than the outer diameters of the sleeves 22' and 35'. The sleeve 51 is fitted over the sleeves 22' and 35' between the fan 38' and the rotor 21' for axial sliding movements. The axial length of the sleeve 51 is such that a space is provided between the rotor 21' and the end of the sleeve 51 adjacent the rotor 21'. A plurality of weights 52 are pivotally mounted to the end of the rotor 21' adjacent the sleeve 51 for movement about an axis perpendicular to the axis of the shaft 20'. Each of the weights 52 has a radially inwardly directed finger 53 which extends into the space between the sleeve 51 and the rotor 21' and generally bears against the end of the sleeve 51. The weights 52 and the fingers 53 are constructed so that centrifugal force tends to move the weights 52 outwardly pivoting the fingers 53 against the end of the sleeve 51 and producing a bias on clutch plates 25'—37'. The bias on the clutch plates 25'—37' increases as the rotational speed of the rotor 21' increases, thereby, increasing the frictional force tending to rotate the shaft 20' with the rotor 21'.

Thus, in the different embodiment illustrated in FIG. 2 the rotor 21' is free to start with essentially no load thereon and as the rotational speed thereof increases the coupling to the shaft 20' increases. It should be understood that many forms of centrifugally sensitive members might be utilized to increase the clutch action and the present embodiment is illustrated because of its simplicity. Further, it should be understood that the clutch mechanism illustrated might be positioned differently or it might be incorporated into an electric motor in a variety of different ways and modifications designed by one skilled in the art.

We claim:
1. An electric motor comprising:
  a. a stator;
  b. a motor operatively positioned within said stator;
  c. an output shaft rotatably and coaxially mounted relative to said stator and said rotor and adapted to have a load affixed thereto for rotation thereby;
  d. a first sleeve coaxially mounted over said output shaft and engaged with said rotor so as to be rotatable with said rotor, said first sleeve and said output shaft being axially movable relative to one another;
  e. first frictional clutch members affixed relative to said rotor and said first sleeve for rotation therewith;
  f. mating frictional clutch members affixed to said shaft adjacent said first frictional clutch members for rotation with said shaft; and
  g. spring means for biasing said first and said mating frictional clutch members into engagement for causing said output shaft to rotate with said rotor and providing clutch action therebetween.

2. An electric motor as set forth in claim 1 wherein the sleeve has a fan affixed thereto for cooling the motor.

3. An electric motor as set forth in claim 1 wherein the spring biasing means includes a compression spring with a force sufficient to produce a frictional force between the clutch members which is less than the starting torque of the electric motor.

4. An electric motor as set forth in claim 3 including a second sleeve coaxially mounted over said output shaft wherein:
  a. said first frictional clutch members include a clutch member attached to said second sleeve for frictional engagement with one of said mating clutch members; and
  b. said first and second sleeves include axially overlapping portions which mate to allow relative axial movement and to prevent relative rotational movement.

5. An electric motor as set forth in claim 4 wherein:
  a. said first frictional clutch members include first and second clutch plates, said first clutch plate being affixed to said second sleeve and directed axially outward in one direction therefrom and said second clutch plate being affixed relative to said rotor and directed axially outward in the opposite direction therefrom;
  b. said mating frictional clutch members include first and second mating clutch plates affixed relative to said shaft coaxial with and adjacent said first and second clutch plates, respectively, for frictional engagement therewith;
  c. said compression spring is mounted coaxially over said first and second sleeves; and
  d. said overlapping portions of said first and second sleeves include mating first and second semicylindrical slots in adjacent ends thereof, respectively.

UNITED STATES PATENT OFFICE
CERTIFICATE OF CORRECTION

Patent No. 3,555,317                  Dated January 12, 1971

Inventor(s) Peter D. Allan et al.

It is certified that error appears in the above-identified patent and that said Letters Patent are hereby corrected as shown below:

Column 1, line 7, "torgue" should read -- torque --. Column 2, line 41, "an", second occurrence, should read -- a --; line 42, after "member 30" insert -- and between the clutch plate 37 and the frictional surface of the tubular member 40 --. Column 3, line 31, "motor" should read -- rot Signed and sealed this 17th day of August 1971.

(SEAL)
Attest:

EDWARD M. FLETCHER, JR.           WILLIAM E. SCHUYLER, JR.
Attesting Officer                  Commissioner of Patents